(12) United States Patent
Yong et al.

(10) Patent No.: US 10,391,403 B2
(45) Date of Patent: Aug. 27, 2019

(54) GAME EXTENSIONS IN A GAMING ENVIRONMENT

(71) Applicants: SONY CORPORATION, Tokyo (JP); SONY NETWORK ENTERTAINMENT INTERNATIONAL LLC, Los Angeles, CA (US)

(72) Inventors: Stephen Yong, San Francisco, CA (US); Yehya Fahimuddin, San Francisco, CA (US); Alexander J Bustin, San Francisco, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 314 days.

(21) Appl. No.: 14/468,525

(22) Filed: Aug. 26, 2014

(65) Prior Publication Data
US 2015/0133211 A1 May 14, 2015

Related U.S. Application Data

(60) Provisional application No. 61/904,186, filed on Nov. 14, 2013.

(51) Int. Cl.
*A63F 13/69* (2014.01)
*A63F 13/35* (2014.01)
*A63F 13/73* (2014.01)
*A63F 13/79* (2014.01)

(52) U.S. Cl.
CPC .............. *A63F 13/69* (2014.09); *A63F 13/35* (2014.09); *A63F 13/73* (2014.09); *A63F 13/79* (2014.09)

(58) Field of Classification Search
CPC .................................................. G06F 16/957
See application file for complete search history.

(56) References Cited

U.S. PATENT DOCUMENTS

| | | | |
|---|---|---|---|
| 8,152,635 B2 * | 4/2012 | Leingang | A63F 13/12 463/29 |
| 2002/0100058 A1 * | 7/2002 | Hirose | G06F 17/30876 725/113 |
| 2003/0034964 A1 * | 2/2003 | Yoshioka | G06F 17/3089 345/204 |
| 2003/0050118 A1 * | 3/2003 | Suzuki | A63F 13/12 463/42 |
| 2004/0068536 A1 * | 4/2004 | Demers | G06F 17/30899 709/201 |
| 2007/0185917 A1 * | 8/2007 | Prahlad | G06F 17/30997 |

(Continued)

FOREIGN PATENT DOCUMENTS

WO 2008094168 A1 8/2008

*Primary Examiner* — James S McClellan
*Assistant Examiner* — Kevin M Carter
(74) *Attorney, Agent, or Firm* — Chip Law Group

(57) ABSTRACT

Various aspects of a system and a method for providing one or more game extensions in a gaming environment are disclosed herein. The one or more game extensions that correspond to a selected game are dynamically determined. The game is selected based on a user input at a computing device. The one or more game extensions are transmitted to the computing device. Each of the one or more game extensions are associated with one or more pre-defined configurable actions that are triggered based on user interaction with a respective game extension.

21 Claims, 6 Drawing Sheets

(56) References Cited

U.S. PATENT DOCUMENTS

| | | | |
|---|---|---|---|
| 2007/0202941 A1* | 8/2007 | Miltenberger | G07F 17/32 463/25 |
| 2007/0219988 A1* | 9/2007 | Mueller | G06Q 10/087 |
| 2007/0239780 A1* | 10/2007 | Hugill | G06F 17/30038 |
| 2007/0244980 A1* | 10/2007 | Baker, III | G06Q 10/107 709/207 |
| 2008/0009345 A1* | 1/2008 | Bailey | G07F 17/3251 463/29 |
| 2008/0214155 A1 | 9/2008 | Ramer et al. | |
| 2008/0227538 A1* | 9/2008 | Kelly | A63F 3/081 463/27 |
| 2008/0248845 A1 | 10/2008 | Morgan et al. | |
| 2009/0138484 A1* | 5/2009 | Ramos | G06F 17/30 |
| 2009/0187486 A1* | 7/2009 | Lefenfeld | G06Q 30/02 705/14.73 |
| 2011/0040586 A1* | 2/2011 | Murray | G06Q 30/02 705/14.49 |
| 2012/0064976 A1* | 3/2012 | Gault | H04N 21/241 463/42 |
| 2012/0071230 A1* | 3/2012 | Lagercrantz | G07F 17/32 463/22 |
| 2012/0157190 A1 | 6/2012 | Hungate | |
| 2012/0166308 A1* | 6/2012 | Ahmed | G06Q 20/12 705/26.41 |
| 2012/0231888 A1* | 9/2012 | Abe | A63F 13/58 463/42 |
| 2013/0167159 A1* | 6/2013 | Ricci | H04W 4/90 719/319 |
| 2013/0179859 A1 | 7/2013 | Kang et al. | |
| 2013/0324209 A1* | 12/2013 | Kishimoto | G07F 17/3272 463/17 |
| 2014/0004938 A1* | 1/2014 | Allen | G07F 17/3241 463/29 |
| 2015/0011318 A1* | 1/2015 | Takahashi | A63F 13/335 463/37 |
| 2015/0072779 A1* | 3/2015 | Kitamura | A63F 13/69 463/29 |
| 2015/0116328 A1* | 4/2015 | Ikeda | A63F 13/5252 345/427 |
| 2015/0199318 A1* | 7/2015 | Lemonik | G06F 9/44526 715/255 |

* cited by examiner

GAME EXTENSIONS IN A GAMING ENVIRONMENT

CROSS-REFERENCE TO RELATED APPLICATIONS/INCORPORATION BY REFERENCE

This application makes reference to, claims priority to, and claims the benefit of U.S. Provisional Application Ser. No. 61/904,186 filed on Nov. 14, 2013.

FIELD

Various embodiments of the disclosure relate to game extensions. More specifically, various embodiments of the disclosure relate to a system and method for managing and providing game extensions in a gaming environment.

BACKGROUND

Games played in a gaming network are becoming increasingly popular. A user is able to create a profile in the gaming network and play games the user is interested in. In accordance with user's preferences, the profile provides access to a virtual gaming environment displaying information, such as user's gaming friends, related advertisements and game activities. However, the display of such information and interaction within the gaming environment is the same for all users in the gaming network.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method are provided for managing and providing game extensions in a gaming environment as shown in, and described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various implementations may be found in a system and method for managing and providing game extensions. Exemplary aspects of a method for providing one or more game extensions in a gaming environment include a server communicatively coupled to a computing device. In an embodiment, the server may be operable to dynamically determine the game extensions that correspond to a selected game. Information regarding the selected game may be received from a computing device based on a user input at the computing device. The server may be operable to transmit the game extensions to the computing device. Each of the one or more game extensions may be associated with one or more pre-defined configurable actions that are triggered based on user interaction with the one or more game extensions.

In an embodiment, the game extensions comprise one or more of an application, an applet, a plug-in, an add-on, a video, an image, an animation, and/or a hyperlink to a web-page. In an embodiment, the computing device may be a game console. In an embodiment, the one or more game extensions may be dynamically determined based on a user profile of the user selecting the game. In an embodiment, the one or more game extensions may be displayed in a configurable area of an information panel associated with the user profile in the gaming environment. In an embodiment, the one or more game extensions may be displayed as one or more display tiles in the configurable area.

In an embodiment, the one or more game extensions may comprise pre-defined game extensions from a library of game extensions. In another embodiment, the one or more game extensions may comprise configurable game extensions comprising configurable HyperText Markup Language (HTML)-based content. In an embodiment, the server may be operable to compile the one or more game extensions in response to the selection of the game.

Figure 1:
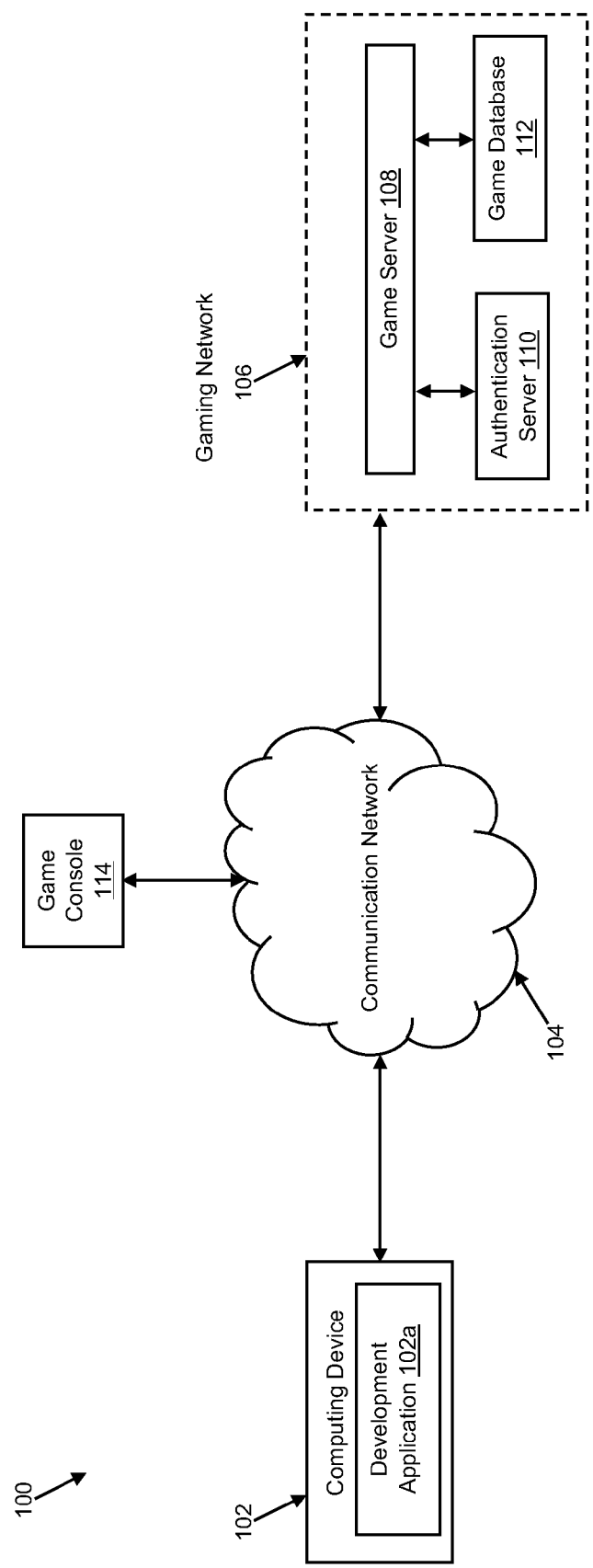
FIG. 1 is a block diagram illustrating a network environment for managing game extensions in a gaming environment, in accordance with an embodiment of the disclosure.

FIG. 1 is a block diagram illustrating a network environment for managing game extensions in a gaming environment, in accordance with an embodiment of the disclosure. With reference to FIG. 1, there is shown a network environment 100. The network environment 100 may comprise a computing device 102, a communication network 104 and a gaming network 106. The gaming network 106 may comprise a game server 108, an authentication server 110, a game database 112 and one or more game consoles, such as game console 114.

The computing device 102 may comprise suitable logic, circuitry, interfaces, and/or code to enable the computing device to process information to configure game extensions for a game. Examples of the computing device include, but are not limited to, a tablet, a personal digital assistant (PDA), a mobile device, a conventional desktop computer, and/or the like. The computing device 102 may be installed with a development application 102a, to enable a developer to configure game extensions for a game. The development application 102a may be downloaded from the gaming network 106. The development application 102a may be referred to as a Software Development Kit (SDK).

The computing device 102 may comprise suitable logic, circuitry, interfaces, and/or code that may be enable communication with the game server 108, either directly or via the communication network 104. The computing device 102 may communicate with the communication network 104 using a wired and/or a wireless connection. The wired communication may use any of a plurality of telephone lines, fiber optic cables, microwave transmission, and/or the like. The wireless communication may use any of a plurality of communication standards, protocols and technologies including, but not limited to, Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, and/or the like.

The communication network 104 may include a medium through which the computing device 102 may communicate with the game server 108 in the gaming network 106. Examples of the communication network 104 may include, but are not limited to, the Internet, a Wireless Fidelity (WiFi) network, a Wireless Local Area Network (WLAN), a Local Area Network (LAN), a telephone line (POTS), or a Metropolitan Area Network (MAN). Various devices in the network environment 100 may be operable to connect to the communication network 104, in accordance with various wired and wireless communication protocols, such as, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

The game server 108 may comprise suitable logic, circuitry, interfaces, and/or code that may enable communication with the computing device 102, the authentication server 110, the game database 112, and the game console 114, either directly or via the communication network 104. The game server 108 may be configured to manage data and communications associated with events and activities in games that can be played in a networked environment. The game server 108 may be configured to receive and process an input from the game console 114. The game server may be configured to transmit the processed input to the game console 114 to allow each player of a game, in a multi-player or single-player environment, to maintain the player's version of the game based on the input. The game server may be configured to manage a profile of a player in the gaming network 106 and to render the profile to each player on the game console 114. The game server 108 may be configured to generate and manage game extensions for a game in the gaming network 106.

The authentication server 110 may comprise suitable logic, circuitry, interfaces, and/or code that may enable communication with the game server 108. The authentication server 110 may be configured to perform authentication of an entity accessing the game server 108 and/or services provided by the game server 108. The authentication server 110 may be a standalone server or an application running on the game server 108. The authentication server 110 may be configured to perform authentication of requests received from the computing device 102. Based on the authentication, the authentication server 110 may allow the computing device 102 to download and/or access the development application 102a from the game server 108. The authentication server 110 may be configured to authenticate a user accessing the games, game extensions and/or game related services provided by the game server 108.

The game database 112 may comprise suitable logic, circuitry, interfaces, and/or code that may enable communication with the game server 108. The game database 112 provides a digital storage and distribution platform for games, game extensions, game-related services, and/or the like. The game database 112 may be a standalone entity, an application running on the game server 108, or a service provided by the game server 108. The game database 112 may allow users to browse games, play games online, access and/or download games, game extensions and other applications/services. The game database 112 may be configured as an online game store of games and game extensions. The game database 112 may be implemented by the use of various multimedia database management systems that are well known to those skilled in the art.

The game console 114 may comprise suitable logic, circuitry, interfaces, and/or code that may enable communication with the game server 108. The game console 114 may be configured to output audio and/or video signals to enable a user to play a game provided by the game server 108. The game console 114 may be a computing device configured to enable a user to play a game in the gaming network 106. The game console 114 may be configured as a display device or be connected to a display device to render the game. The game console 114 may comprise various components, such as buttons, joysticks, icons, a keyboard, a mouse, a touch screen, a microphone, a camera, a motion sensor, a light sensor, a docking station, and/or the like.

In operation, the game server 108 may be operable to dynamically determine the game extensions that correspond to a selected game. Information regarding the selected game may be received from the game console 114, based on a user input at the game console 114. The game server 108 may be operable to transmit the game extensions to the game console 114. Each of the one or more game extensions is associated with one or more pre-defined configurable actions that are triggered based on user interaction with the one or more game extensions.

In an embodiment, the user of the game console 114 may have a profile on the gaming network 106. The profile provides an interface for the user to access the gaming network 106. The profile may provide an information panel to summarize and represent gaming information associated with the user. The profile of the user may be configured to display the game extensions generated and managed by the game server 108.

In an embodiment, the game extensions may comprise one or more of an application, an applet, a plug-in, an add-on, a video, an image, an animation, and/or a hyperlink to a web-page. In an embodiment, the one or more game extensions may be dynamically determined based on a user profile of the user selecting the game. In an embodiment, the one or more game extensions may be displayed in a configurable area of the information panel associated with the user profile in the gaming network 106. In an embodiment, the one or more game extensions may be displayed as one or more display tiles in the configurable area. In an embodiment, the one or more game extensions may comprise pre-defined game extensions from a library of game extensions. In another embodiment, the one or more game extensions may comprise configurable game extensions comprising configurable HTML-based content.

In an embodiment, the game extensions configured by the developer using the development application 102a may be managed and generated by the game server 108. The game extensions may be displayed on the game console 114 or a display device connected to the game console 114. The game extensions may be displayed as display tiles in the user profile of the user.

In an embodiment, the development application 102a may be hosted on game server 108 of the gaming network 106. The developer may register and create a developer account on the gaming network 106 using the computing device 102. The developer may be provided with access rights to the development application 102a via the developer account and be provided with a development environment to configure the game extensions.

Figure 2:
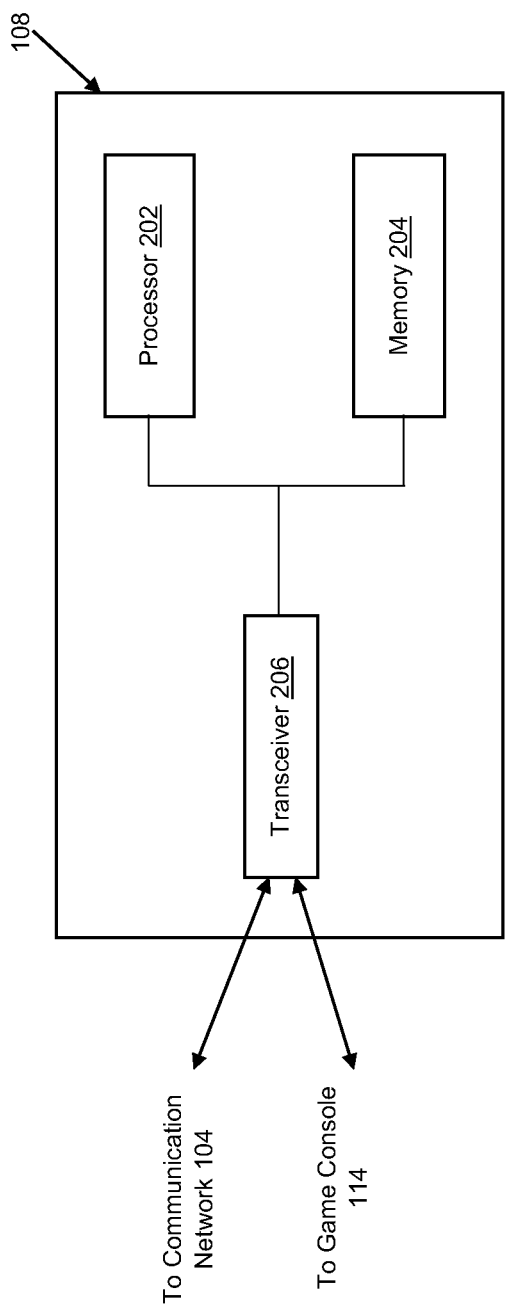
FIG. 2 is a block diagram illustrating a computing device for managing game extensions in a gaming environment, in accordance with an embodiment of the disclosure.

FIG. 2 is a block diagram illustrating a computing device for managing game extensions in a gaming environment, in accordance with an embodiment of the disclosure. FIG. 2 is explained in conjunction with elements from FIG. 1. With reference to FIG. 2, there is shown the game server 108, which may comprise one or more processors, such as processor 202, a memory 204 and a transceiver 206.

The processor 202 may receive input via the transceiver 206 and/or the memory 204. The processor 202 may be communicatively coupled to the memory 204, and the transceiver 206. The processor 202 may be operable to process the received information to provide game extensions to the game console 114. The processor 202 may comprise suitable logic, circuitry, interfaces, and/or code that may be operable to execute a set of instructions stored in the memory 204. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or any other processor.

The memory 204 may comprise suitable logic, circuitry, interfaces, and/or code that may be operable to store the received set of instructions. The memory 204 may be implemented based on, but not limited to, a Random Access Memory (RAM), a Read-Only Memory (ROM), a Hard Disk Drive (HDD), a storage server and/or a Secure Digital (SD) card. The memory 204 may be configured to store multimedia content. Examples of multimedia content may include, but are not limited to, games, game extensions, applications, video files, audio files, images and/or the like. The memory may be communicatively coupled to a secondary storage device, such as a hard disk or an external storage device, such as a compact disc (CD). Such a communicative coupling may enable the memory to buffer multimedia content retrieved from the secondary storage device or the external storage device. The memory 204 may be operable to store the game extensions and/or user profiles of users associated with the computing device and the game console 114.

The transceiver 206 may comprise suitable logic, circuitry, interfaces, and/or code that may be operable to communicate with the computing device 102, either directly or via the communication network 104. The transceiver may be operable to communicate with the authentication server 110, game database 112, and the game console 114. The transceiver 206 may implement known technologies for supporting wired or wireless communication with the communication network 106. The transceiver 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a memory. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies including, but not limited to, Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the processor 202 may be operable to provide game extensions on the game console 114 in a gaming environment. The processor 202 may receive a selection of a game via the transceiver 206. The game is selected from a menu of games displayed on the user profile. In response to receiving the selection of the game at the game console 114, the processor 202 may retrieve game extensions associated with the selected game from the memory 204. The processor 202 may then communicate with the game console 114 to display the retrieved game extensions as display tiles on the user profile.

In an embodiment, the processor 202 may be operable to receive an authentication code that corresponds to each of the one or more game extensions from the computing device 102. The processor 202 may transmit the received authentication code to the authentication server 110. The processor 202 may receive an access token from the authentication server 110 in response to the transmitted authentication code. The processor retrieves data associated with a respective game extension of the one or more game extensions from the game database 112 using the access token. The processor 202 may transmit data to the computing device 102 to generate the one or more game extensions.

In an embodiment, the generated game extensions are submitted from the computing device 102 to the game server 108. The processor 202 may be operable to receive game extensions configured by the developer using the development application 102a and store them in the memory 204.

Figure 3:
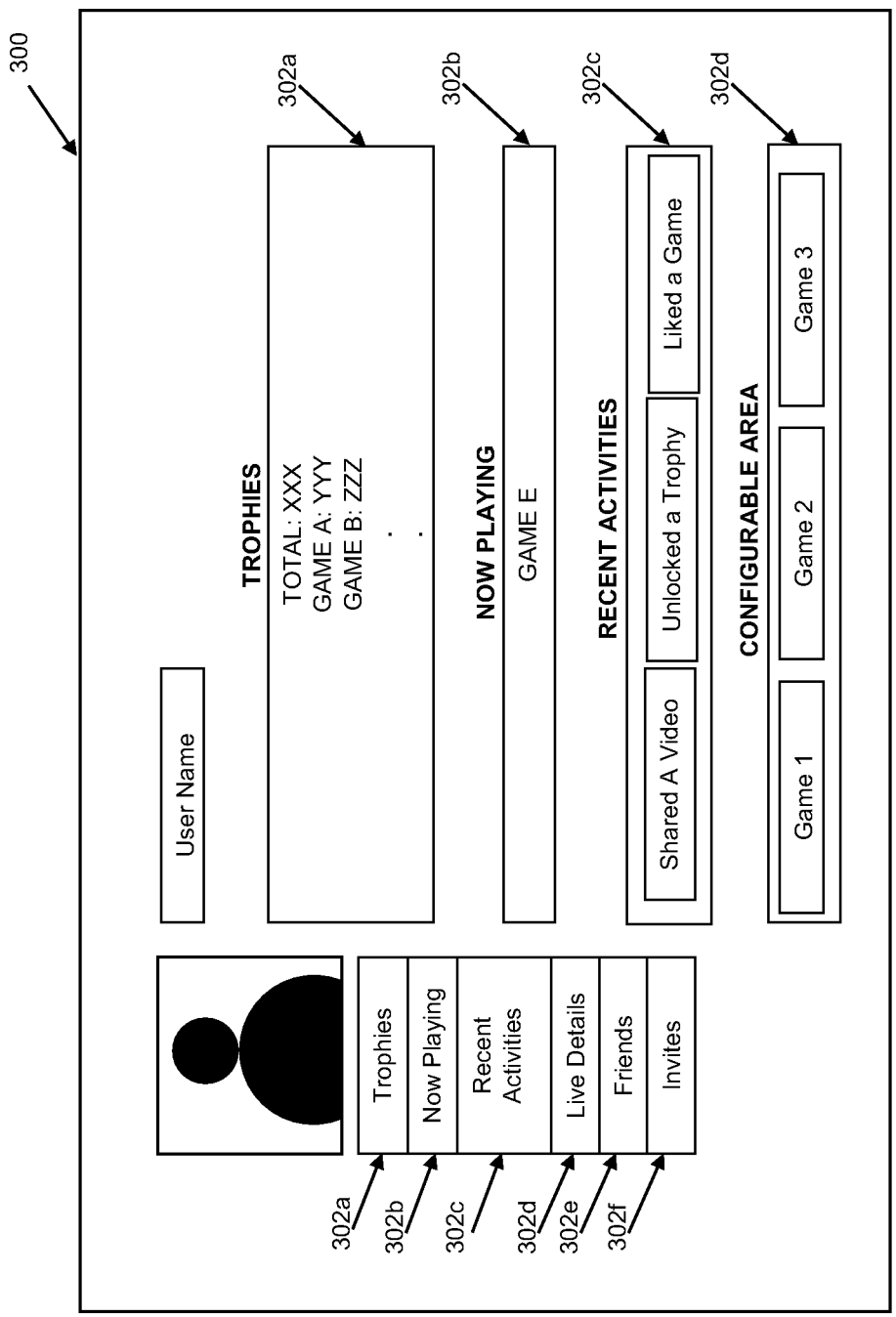
FIG. 3 is a diagram illustrating an exemplary user profile in the gaming network, in accordance with an embodiment of the disclosure.

FIG. 3 is a diagram illustrating an exemplary user profile in the gaming network 106, in accordance with an embodiment of the disclosure. With reference to FIG. 3, the user profile 300 of the user in the gaming network 106 is shown. The user profile 300 is an information panel associated with the user and may comprise gaming information that corresponds to the user. The gaming information may comprise gaming achievements 302a, games the user is currently playing 302b, recent activities of the user 302c, a configurable area 302d, gaming friends 302e, gaming/friend invites 302f, and/or the like.

In an embodiment, the configurable area 302d may be associated with game extensions that may comprise real-time details of games and gaming activities of the user in the gaming network 106. The user may click on the configurable area 302d to view the configurable area shown in FIG. 4. The game extensions may be displayed as display tiles associated with games on the gaming network.

Figure 4:
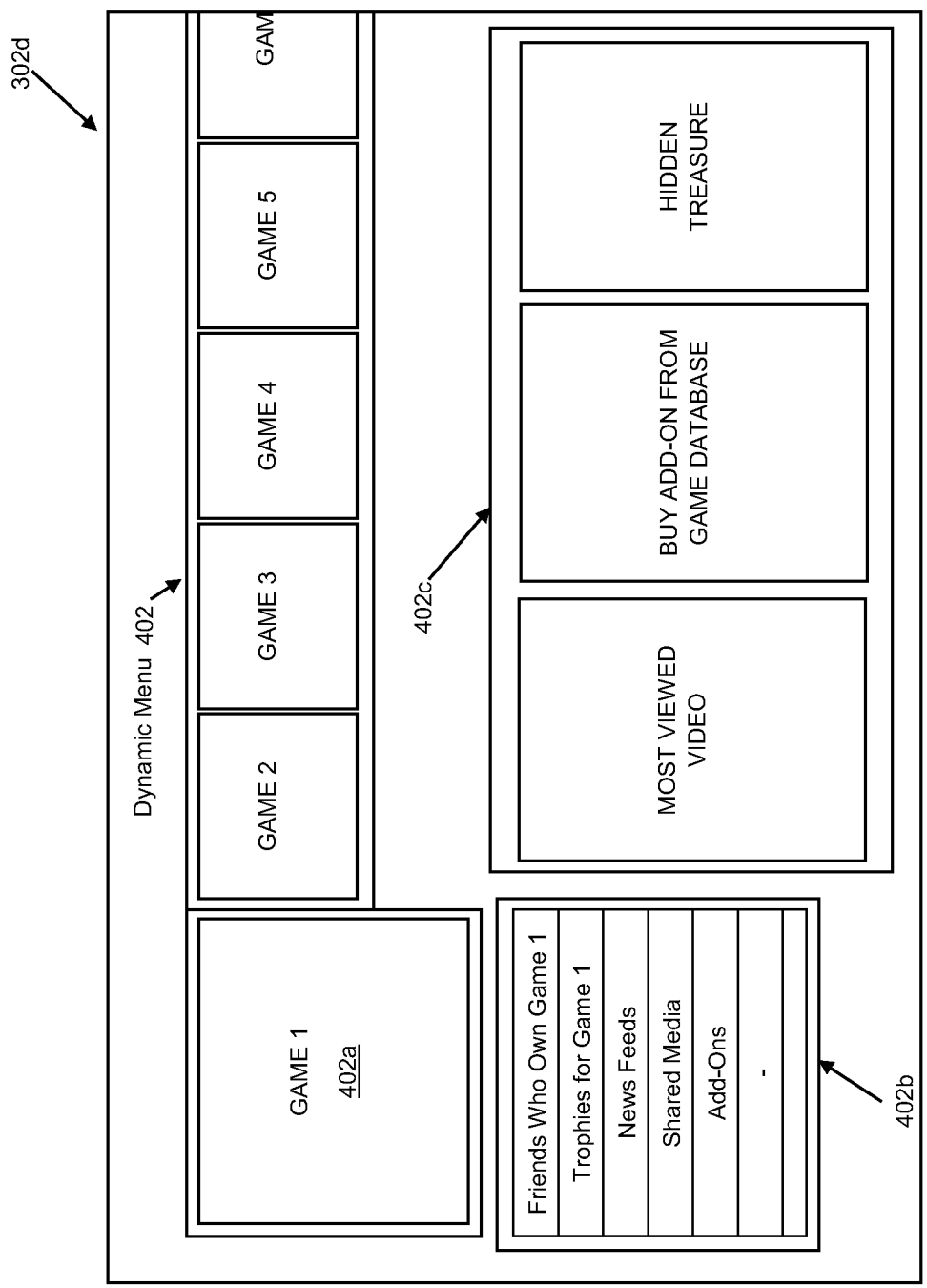
FIG. 4 is a block diagram illustrating an exemplary configurable area associated with the user profile, in accordance with an embodiment of the disclosure.

FIG. 4 is a block diagram illustrating an exemplary configurable area associated with the user profile, in accordance with an embodiment of the disclosure. FIG. 4 is explained in conjunction with elements from FIG. 3. With reference to FIG. 4, the configurable area 302d of the user profile 300 is shown. The configurable area 302d may comprise a menu of games 402. When the user is presented with the configurable area 302d on the game console 114, the user may select a game 402a from the menu 402. The menu 402 may be dynamic and change based on information in the user profile 300, user history, gaming preferences of the user, friends, and/or the like. Each game in the menu 402 is associated with details 402b and configurable display tiles 402c.

In response to selection of a game 402a, the details 402b and the configurable display tiles 402c are dynamically updated. Examples of details 402b may include, but are not limited to, friends who own the selected game 402a, the user's trophies and/or achievements associated with game 402a, news feeds for game 402a, shared media, add-ons, and/or the like.

The display tiles 402c associated with the selected game 402a comprise game extensions associated with the selected game 402a. The display tiles 402c may be determined based on the selected game and associated with user selecting the game 402a. In an embodiment, each of the game extensions 402c is associated with a pre-defined configurable action that is triggered based on the user's interaction with respective display tiles 402c.

In response to selection of the game 402a, the game server 108 retrieves stored game extensions from the memory 204 or the game database 112. The retrieval of the game extensions 402c is based on information in the user profile, user history, gaming preferences of the user, friends and/or the like. Each of the game extensions 402c is associated with a pre-defined configurable action that is triggered by user interaction with the respective game extension. Examples of user interaction at the game console 114 include, but are not limited to, a mouse click, a touch or tap on a touchscreen, and/or the like.

In instances, where the user selects another game from the menu of games 402, the display tiles 402c associated with the previously selected game are removed from the configurable area 302d, and display tiles 402c associated with the currently selected game are displayed.

In an embodiment, the game extensions may comprise pre-defined game extensions. The pre-defined game extensions are provided from a library of game extensions. The pre-defined game extensions may comprise a video tile, an image tile or an "online store" tile. The video tile may comprise video content with a poster frame and a caption. The display tile may comprise an image and a caption. The "online store" tile may comprise a display of a product from the online game store associated with the game database 112. Other examples of the pre-defined game extensions may include, but are not limited to, an application, an applet, a plug-in, an add-on, an animation, and/or a hyperlink to a web-page. The content of the pre-defined game extensions may be configured by the developer using the development application 102a at the computing device 102.

In an embodiment, the game extensions may comprise HTML-based configurable game extensions. Examples of the HTML-based configurable game extensions include, but are not limited to, an application, an applet, a plug-in, an add-on, a video, an image, an animation, and/or a hyperlink to a web-page. In an embodiment, the HTML-based display tiles may be used to display player character details or team stats, real-time social leaderboards, trigger mini-game events with a click, recap video of a players adventure, animated game items or characters to draw attention, create different entry points into a game, live updates of in-game activities of friends or community and/or the like.

In an embodiment, the pre-defined game extensions are each associated with pre-defined configurable actions. The developer may configure the action by selecting from a set of pre-defined actions. Examples of pre-defined actions include, but are not limited to, launching a game, buying an add-on, playing a full screen video, viewing a product detail in a web-based store, opening an external website, launching an application, and/or the like.

In an embodiment, the HTML-based configurable game extensions may each be associated with a configurable pre-defined action. The developer may configure the game extensions such that for each type of game extension, one of the pre-defined actions is triggered based on the information in the user's profile, user history, gaming preferences, friends, community, and/or the like. The pre-defined actions associated with HTML-based configurable game extensions are more dynamic compared to the pre-defined game extensions.

In an embodiment, the developer may be able to develop game extensions beyond those provided in the library of pre-defined game extensions. The content of the developed HTML-based game extensions may be configured by the developer using the development application 102a at the computing device 102. Based on the usage of the developed HTML-based configurable game extensions, the developed HTML-based configurable game extensions may be added to the library of pre-defined game extensions.

In an embodiment, the game server 108 may determine which game extensions stored in the memory 204 are to be displayed in response to the selection of the game 402a from the menu of games 402. In instances where the game extensions to be displayed are HTML-based game extensions, the server 108 may compile the HTML-based game extensions and transmit the compiled game extensions to the game console 114 for display as display tiles 402c.

In an embodiment, the display tiles 402c may be instances of the game extensions stored in the memory 204 of the game server 108. The display tiles may use HTML5 local storage or cookies for running instances of the game extensions on the game console 114.

Figure 5:
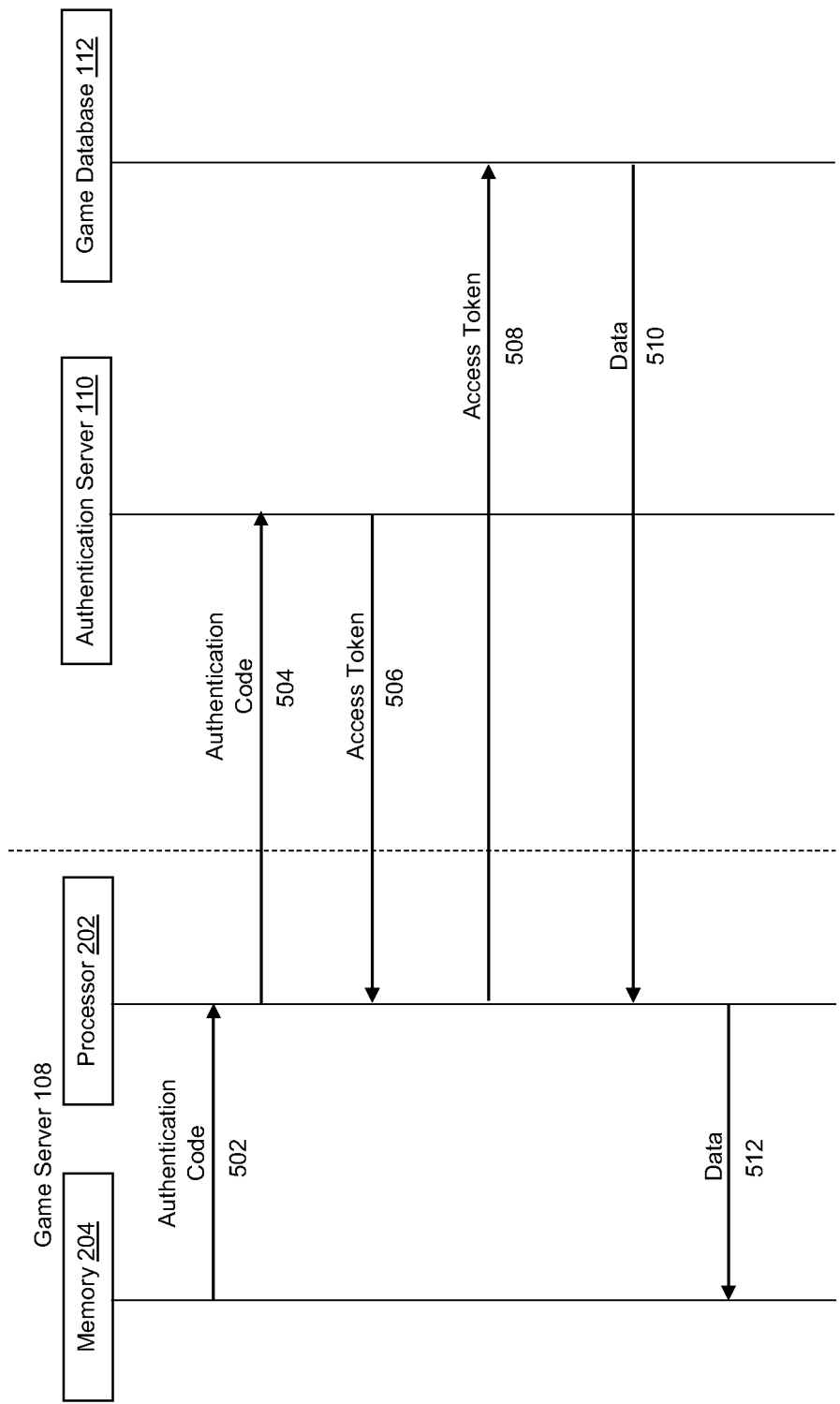
FIG. 5 is a timing diagram illustrating exemplary steps for retrieving data from a game database for generating the game extensions, in accordance with an embodiment of the disclosure.

FIG. 5 is a timing diagram illustrating exemplary steps for retrieving data from the game database 112 for generating the HTML-based configurable game extensions, in accordance with an embodiment of the disclosure. FIG. 5 is explained in conjunction with elements from FIG. 1 and FIG. 2.

In an embodiment, data may be retrieved from the game database 112 in order to compile content of an HTML-based configurable game extension associated with a particular game. The HTML-based game extension being generated using the game server 108 and stored in the memory 204 may be assigned an authentication code. At step 502, the authentication code assigned to the HTML-based game extension may be sent to the processor 202 of the game server 108.

At step 504, the game server 108 may transmit the authentication code received in step 502 to the authentication server 110. At step 506, the authentication server 110 may transmit an access token to the game server 108 in response to the authentication code received in step 504.

At step 508, the game server 108 may send the access token received in step 506 to the game database 112. At step 510, the game database 112 may send data associated with the game for configuring the HTML based game extension to the game server 108, based on the access token received in step 508.

At step 512, the processor 202 may send the data received in step 510 to the corresponding HTML-based game extension stored in the memory 204. The processor 202 may then compile the corresponding HTML-based game extension based on the data received in step 512.

In an embodiment, the developer may generate an HTML source code for configuring the HTML-based game extensions. The HTML source code may be compressed and uploaded to the game server 108. The uploaded HTML source code associated with the game extensions may be reviewed and approved by an administrator of the game server 108. After approval, the game extensions may be published on the game server 108. The HTML source code of the published game extensions may be compiled in response to selection of a game from a menu of games 402 on the console 114.

Figure 6:
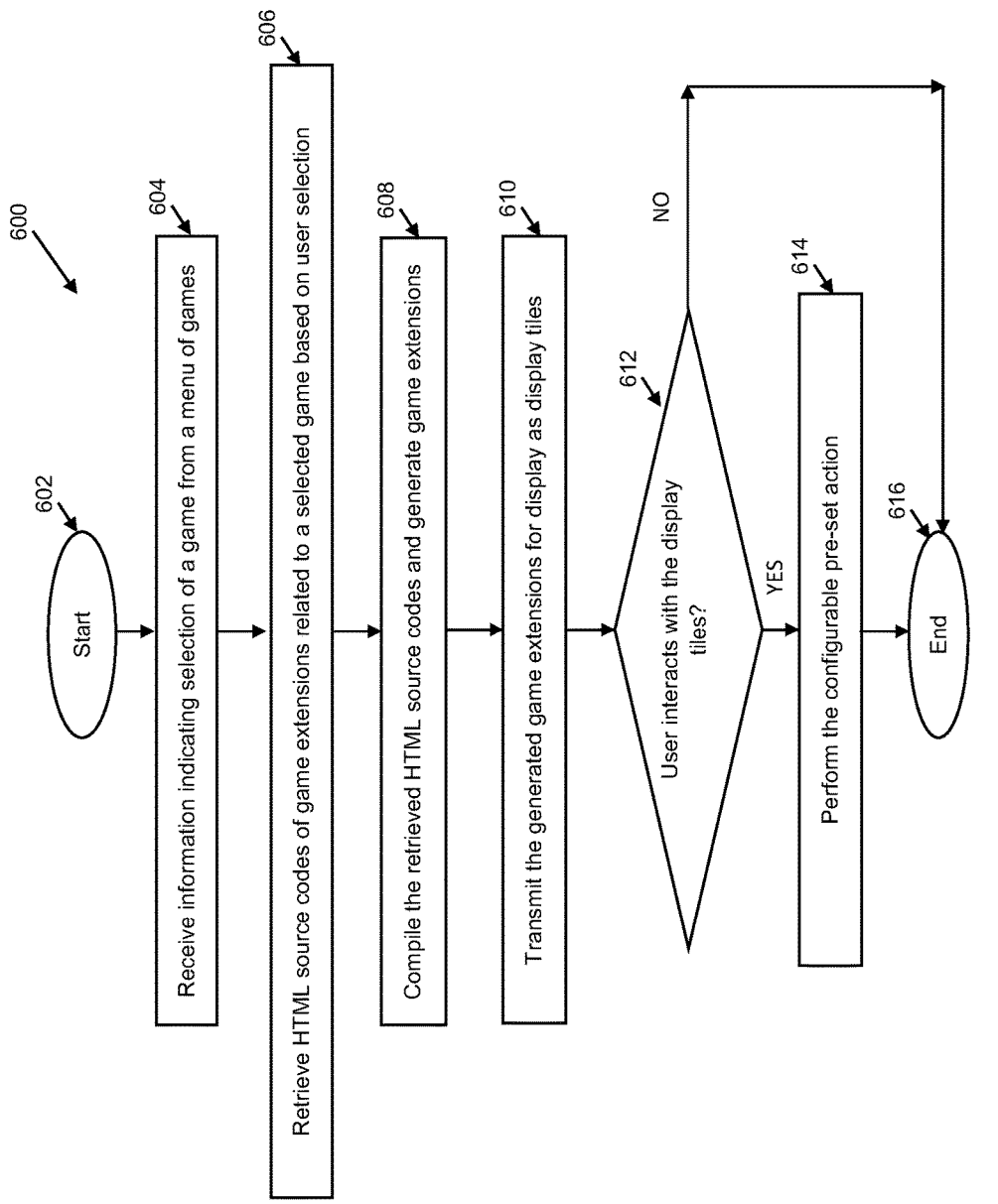
FIG. 6 is an exemplary flow chart illustrating exemplary steps for managing and providing game extensions in a gaming environment, in accordance with an embodiment of the disclosure.

FIG. 6 is an exemplary flow chart illustrating exemplary steps for managing and providing game extensions in a gaming environment, in accordance with an embodiment of the disclosure. With reference to FIG. 6, there is shown a flow chart 600. The flow chart 600 is described in conjunction with the diagrams of FIG. 1, FIG. 2, FIG. 3, FIG. 4 and FIG. 5.

The method starts at step 602 and proceeds to step 604. At step 604, the information indicating selection of a game 402*a* from a menu of games 402 displayed on the console 114 is received.

At step 606, the HTML source codes are retrieved from the memory 204. The retrieved source codes correspond to game extensions associated with the selected game 402*a*. The game extensions may also be determined based on the information in the user's profile, user history, gaming preferences, friends, community and/or the like. The control then passes to step 608.

At step 608, the retrieved HTML source codes may be compiled to generate game extensions 402*c*. At step 610, the generated game extensions 402*c* may be sent to the game console 114 to be displayed in the configurable area 302*d* of the user profile 300 as display tiles.

At step 612, it may be determined whether the user interacts with the display tiles of the game extensions 402*c*. In instances where it is determined that the user has not interacted with the display tiles 402*c*, the control then passes to step 616 where the method ends. In instances where it is determined that the user interacts with the display tiles, control passes to 614. At step 614, the configurable pre-set action, associated with the display tile that the user interacts with, may be performed.

In accordance with the present disclosure, a system for providing one or more game extensions 402*c* in the gaming environment may comprise a game server 108 communicatively coupled to a game console 114. The game server 108 may comprise one or more processors, hereinafter referred to as the processor 202 (FIG. 2). The processor 202 may be operable to dynamically determine one or more game extensions 402*c* that correspond to a selected game 402*a* (FIG. 4). The game 402*a* may be selected based on a user input at the game console 114. The processor 202 may transmit the one or more game extensions 402*c* to the game console 114. Each of the one or more game extensions 402*c* may be associated with one or more pre-defined configurable actions that are triggered based on user interaction with a respective game extension.

In accordance with another embodiment of the present disclosure, a system for managing one or more game extensions in the gaming environment is disclosed. The game server 108 may be communicatively coupled to a computing device 102. The game server 108 may comprise one or more processors, hereinafter referred to as the processor 202 (FIG. 2). The processor 202 may be operable to receive an authentication code that corresponds to each of the one or more game extensions from the computing device 102. The processor 202 may transmit the received authentication code to the authentication server 110. The processor 202 may receive an access token from the authentication server 110, in response to the transmitted authentication code. Using the access token, the processor may retrieve data associated with a respective game extension of the one or more game extensions from the game database 112. The processor 202 may transmit data to the computing device 102 to generate the one or more game extensions.

Various embodiments of the disclosure may provide a non-transitory computer readable medium and/or storage medium, and/or a non-transitory machine readable medium and/or storage medium having applicable mediums stored thereon, a machine code and/or a computer program having at least one code section executable by a machine and/or a computer. The at least one code section may cause the machine and/or computer to perform the steps comprising providing one or more game extensions in a gaming environment. A user input for selecting a game may be received at the game console. One or more game extensions may be dynamically determined based on the selection of the game. The one or more game extensions may be generated and transmitted to a computing device. Each of the one or more game extensions may be associated with one or more pre-defined configurable actions triggered based on user interaction with a respective game extension.

Accordingly, the present disclosure may be realized in hardware, or a combination of hardware and software. The present disclosure may be realized in a centralized fashion in at least one computer system or in a distributed fashion where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system, comprising:
a server communicatively coupled to a computing device; and
one or more processors in said server, wherein said one or more processors are configured to:
dynamically determine, from a library of game extensions in a gaming environment, at least one game extension corresponding to a game,
wherein said game is selected based on a first user input received at said computing device; and
transmit said at least one game extension to said computing device,
wherein each of said at least one game extension is associated with at least one configurable action,
wherein said at least one configurable action is triggered based on user interaction with said at least one game extension at said computing device,
wherein said computing device adds a newly developed HyperText Markup Language (HTML) based game extension in said library for said dynamic determination of said at least one game extension, based on a usage of said HTML based game extension in said gaming environment,
wherein the newly developed HyperText Markup Language (HTML) based game extension is configured based on a specific configurable action, and wherein said specific configurable action is based on at least one of a user profile, user gaming preferences, user friends, or user communities of a user.

2. The system of claim 1,
wherein said at least one game extension comprises at least one of an application, an applet, a plug-in, an add-on, a video, an image, an animation, or a hyperlink to a web-page.

3. The system of claim 1,
wherein said one or more processors are further configured to receive said first user input indicating said selection of said game from said computing device,
wherein said first user input is inputted by said user at said computing device, and
wherein said computing device is a gaming console.

4. The system of claim 3,
wherein said at least one game extension is determined based on at least one of said user profile, a user gaming history, or said user gaming preferences.

5. The system of claim 1,
wherein said at least one game extension is displayed in a configurable area of an information panel associated with said user profile in said gaming environment,
wherein said configurable area comprises a menu of games,
wherein each game in said menu of games is associated with a detail section and a tile section, and
wherein the detail section and the tile selection are included in said configurable area based on said selection of said game.

6. The system of claim 5,
wherein said at least one game extension is displayed as at least one display tile in said tile section of said configurable area.

7. The system of claim 1,
wherein said at least one game extension corresponds to at least one of said library of said game extensions or configurable game extensions, and wherein said configurable game extensions comprises configurable HTML-based content.

8. The system of claim 1,
wherein said at least one game extension is compiled for display based on said selection of said game.

9. A system, comprising:
a game server communicatively coupled to a computing device; and
one or more processors in said game server, wherein said one or more processors are configured to:
receive an authentication code, corresponding to each of at least one game extension of game extensions in a gaming environment, from said computing device;
transmit said received authentication code to an authentication server;
receive an access token from said authentication server based on said transmitted authentication code; and
transmit data, associated with a respective game extension of said at least one game extension, to said computing device to generate said at least one game extension,
wherein said computing device adds a newly developed HyperText Markup Language (HTML) based game extension in a library of game extensions for dynamic determination of said at least one game extension, based on usage of said HTML based game extension in said gaming environment,
wherein the newly developed HyperText Markup Language (HTML) based game extension is configured based on a specific configurable action, and wherein said specific configurable action is based on at least one of a user profile, user gaming preferences, user friends, or user communities of a user.

10. The system of claim 9,
wherein said one or more processors are further configured to retrieve said data from a game database based on said access token.

11. The system of claim 9,
wherein said one or more processors are further configured to receive said generated at least one game extension from said computing device in said gaming environment.

12. The system of claim 9,
wherein each of said generated at least one game extension is associated with at least one configurable action, and
wherein said at least one configurable action is triggered based on user interaction with said generated at least one game extension at said computing device.

13. A method, comprising:
dynamically determining, form a library of game extensions in a gaming environment, at least one game extension corresponding to a game,
wherein said game is selected based on a first user input at a computing device; and
transmitting said at least one game extension to said computing device,
wherein each of said at least one game extension is associated with at least one configurable action,
wherein said at least one configurable action is triggered based on user interaction with said at least one game extension at said computing device, wherein said computing device adds a newly developed HyperText Markup Language (HTML) based game extension in said library for said dynamic determination of said at least one game extension, based on a usage of said HTML based game extension in said gaming environment, wherein the newly developed HyperText Markup Language (HTML) based game extension is configured based on a specific configurable action, and wherein said specific configurable action is based on at least one of a user profile, user gaming preferences, user friends, or user communities of a user.

14. The method of claim 13,
wherein said at least one game extension comprises at least one of an application, an applet, a plug-in, an add-on, a video, an image, an animation, or a hyperlink to a web-page.

15. The method of claim 13,
wherein said first user input indicating said selection of said game is received from said computing device,
wherein said first user input is inputted by said user at said computing device, and
wherein said computing device is a gaming console.

16. The method of claim 15,
wherein said at least one game extension is determined based on at least one of said user profile, a user gaming history, or said user gaming preferences.

17. The method of claim 13,
wherein said at least one game extension is displayed in a configurable area of an information panel associated with said user profile in said gaming environment,
wherein said configurable area comprises a menu of games,
wherein each game in said menu of games is associated with a detail section and a tile section, and
wherein the detail section and the tile section are included in said configurable area based on said selection of said game.

18. The method of claim 17,
wherein said at least one game extension is displayed as at least one display tile in said tile section of said configurable area.

19. The method of claim 13,
wherein said at least one game extension corresponds to at least one of said library of said game extensions or configurable game extensions, and wherein said configurable game extensions comprises configurable HTML-based content.

20. The method of claim 13, further comprising compiling said at least one game extension based on said selection of said game.

21. The system of claim 1,
wherein said HTML based game extension is developed in a development environment of said gaming environment.

* * * * *